July 6, 1965   J. G. HANSON   3,193,205
SPRINKLER SYSTEM SUPPORT MEANS
Filed July 8, 1963
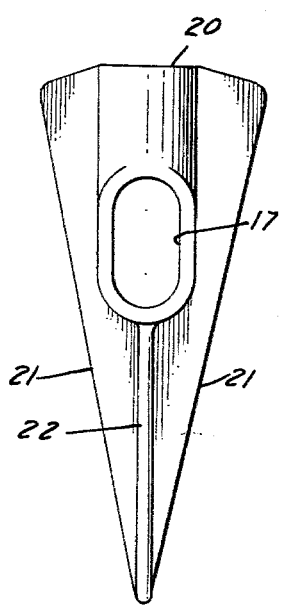
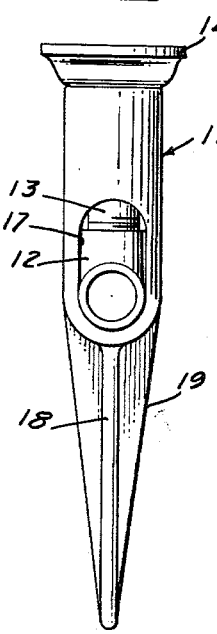
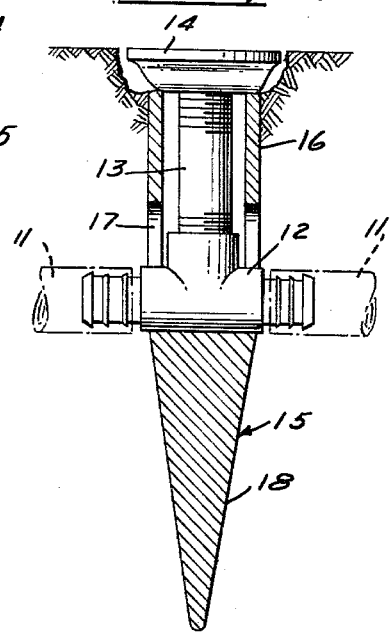
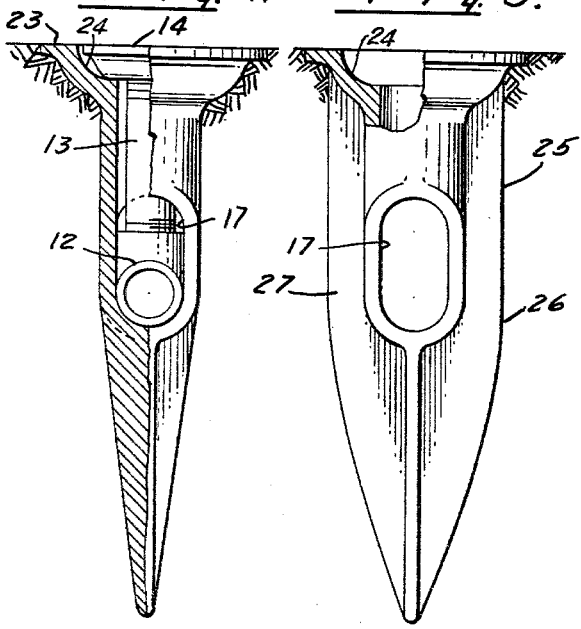
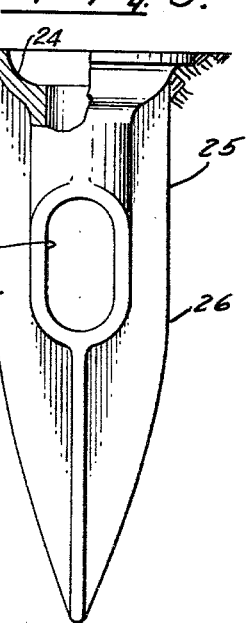
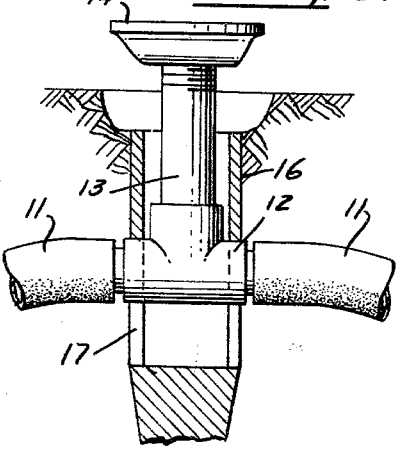
John G Hanson,
INVENTOR.
BY *Vincent C. Tyrrell*
Agent

United States Patent Office 3,193,205
Patented July 6, 1965

3,193,205
SPRINKLER SYSTEM SUPPORT MEANS
John G. Hanson, 3519 185th St., Torrance, Calif.
Filed July 8, 1963, Ser. No. 293,390
9 Claims. (Cl. 239—276)

This invention relates to sprinkling systems imbedded in the earth for watering lawns, and more particularly to the support of the sprinkler head and conduit used in such systems.

In ordinary sprinkling systems the connectors and sprinkling heads are unsupported. Often the sprinkler heads are subject to displacement when they are bumped or run over by a variety of vehicles commonly used in areas ordinarily covered by a lawn. In addition, the maintenance of sprinkling systems requires the removal of sprinkler heads for repair, adjustment or replacement. In unsupported systems and especially those systems using plastic fittings and conduit, the torque necessary to remove the heads is imparted to the fittings and the conduit. The continued torquing can cause failures in the conduit.

An object of the invention is to provide a novel support for the sprinkler head and the conduit connected to said sprinkler head.

Another object of the invention is to provide a support that will prevent the displacement of said sprinkler head when impacted or bumped by an object or tool or vehicle.

Another object of the invention is to provide a support that will allow the sprinkler head or connecting nipple to be removed without impacting torque to the water lines and fittings.

Another object of the invention is to provide a support which will firmly support the sprinkling head and connectors in a vertical upright manner to enable the sprinkler head to irrigate its maximum area.

Another object of the invention is to provide a support that may be easily installed by driving it into the ground.

Another object of the invention is to provide a support for a sprinkling system that will allow the system to be temporarily installed on top of the ground for testing sprinkling head coverage before system is permanently installed below ground.

Further objects and advantages of the invention may become apparent in the following part of the specification wherein the preferred embodiment of the invention is described for the purpose of making a complete disclosure without intending, however, to limit the scope of the invention as defined by the appended claims.

FIG. 1 is a vertical section through the sprinkling system support.

FIG. 2 is a side elevational view of the sprinkling system support as shown in FIG. 1.

FIG. 3 is a side elevational view of a modification of the invention.

FIG. 4 is a combination vertical section and elevational view of a modification of the embodiment shown in FIG. 2.

FIG. 5 is a side elevational view and partial section of a modification of the embodiment of the invention shown in FIG. 4.

FIG. 6 is a sectional view of FIG. 1 illustrating the sprinkling system in a raised position for easy maintenance.

Referring to FIGURES 1 and 2, I show a supply conduit 11 provided with T fitting 12. Attached to the T fitting 12 and extending upward therefrom is a nipple 13, at the upper end of which a sprinkler head 14 is attached. Supporting the parts of this sprinkling system is a support member 15. The upper part 16 of this support member is hollow and is provided with oppositely arranged openings 17 to accommodate the supply pipe 11 and the T fittings 12. The lower portion 18 of the support is adapted to be driven into the ground and the whole support member thus resists any accidental effort to dislodge the sprinkler head 14 or the conduit 11.

The sprinkler head 14 may become damaged and may be removed from the nipple 13 by screwing it counter clockwise in the event the nipple has a right hand thread. When applying the torque necessary to remove the sprinkler head, the vanes 18, 19, 21, 22 of FIGURES 1, 2 and 3 will resist through contact with the ground any tendency to turn. Thus, the flexing of the supply conduit is prevented. It is usual to use a supply conduit of plastic material. Should the sprinkling system be unsupported, the torque required to remove and replace the sprinkler head will be absorbed by the plastic supply conduit. Repeated torquing or bumping by garden or yard vehicles would cause the supply conduit to crack and fail. Thus, the maintenance of such a system often is expensive.

FIG. 3 illustrates a modification of the sprinkler support shown in FIGURES 1 and 2. The vanes 21 extend the full length of the support 20 for maximum resistance against displacement or turning.

In FIGURE 4, there is shown a modification wherein the principal variation in construction is the addition of the disc 23 which has a recess 24 to accommodate the sprinkler head 14. The disc 23 will directly take most of the bumps imparted by yard vehicles and further forms a barrier to keep grass away from the sprinkler head.

In FIGURE 5, the sprinkler support 25 is similar to FIGURE 4 except that vanes 26, 27 extend the full length of the support to give maximum resistance against displacement or turning.

Sometimes it is necessary to adjust the height of the sprinkler heads after they have been installed. The elongated openings 17 in the support member are vertically (longer) larger than the diameter of the conduit 11 and T fittings 12. This larger (longer) opening permits the sprinkling system to be raised relative to the support member as shown in FIG. 6. In this position, the sprinkler head may be removed and a wrench can then remove the extended nipple. A nipple of the correct length may then be installed so that the sprinkler head height is correct in its relationship with the ground level.

Prior to digging a trench in which the water conduit 11 is placed, a preview of the water sprinkling pattern can be acomplished by pressing the lower ends 18 of the support into the ground. The total system then can be evaluated for proper ground area coverage prior to digging trenches for the sprinkling system. The support member 15 aids in forming a true pattern of the sprinkling coverage because the sprinkler head can be supported vertically not only in the testing arrangement but also after the sprinkling system is installed.

The sprinkling head support 15 lends itself to economical manufacturing. Any suitable material that will withstand the environment can be used, as for example, aluminum alloys, plastics, and certain wood material adapted to withstand moisture and decay.

I claim:
1. A sprinkling system comprising:
    a fluid conduit;
    a connector attached to said conduit having an opening in its upper side adapted for attaching a tubular riser member thereto;
    a tubular riser member;
    a sprinkler head attached to the upper end of said riser member; and
    a support for said sprinkling system, said support having a hollow vertical upper portion and a lower portion, said upper portion having oppositely disposed vertically elongated openings to receive said connector, said lower portion forming a tapered spike adapted to be driven into the ground and vertical vanes formed on the sides of said support.

2. A sprinkling system comprising:
a fluid conduit;
a connector attached to said conduit having an opening in its upper side adapted for attaching a tubular riser member thereto;
a tubular riser member;
a sprinkler head attached to the upper end of said riser member;
a support for said sprinkling system, said support having a hollow vertical upper portion and a lower portion, said upper portion having oppositely disposed vertically elongated openings to receive said connector, said lower portion forming a tapered spike adapted to be driven into the ground; and
vertical vanes formed on opposite sides of said support.

3. A support for a water sprinkling system comprising:
an upper hollow vertical portion, said upper portion terminating in a horizontal annular disc, said annular disc having an upwardly opening recess with an annular shoulder at the bottom of said recess, said recess adapted to receive a sprinkler head and support same on said shoulder;
said upper portion having oppositely disposed elongated openings at its lower end; and
a lower portion, said lower portion forming a tapered spike adapted to be driven into the ground.

4. A support for a water sprinkling system comprising:
an upper hollow vertical portion, said upper portion terminating in a horizontal annular disc, said annular disc having an upwardly opening recess with an annular shoulder at the bottom of said recess, said recess adapted to receive a sprinkler head and support same on said shoulder;
said upper portion having oppositely disposed elongated openings at its lower end;
a lower portion, said lower portion forming a tapered spike adapted to be driven into the ground; and
vertical vanes formed on opposite sides of said upper and lower portion.

5. A support for a water sprinkling system comprising:
an upper hollow vertical portion, said upper portion terminating in a horizontal annular disc, said annular disc having an upwardly opening recess with an annular shoulder at the bottom of said recess, said recess adapted to receive a sprinkler head and support same on said shoulder;
said upper portion having oppositely disposed elongated openings at its lower end;
a lower portion, said lower portion forming a tapered spike adapted to be driven into the ground; and
vertical vanes formed on opposite sides of said lower portion.

6. A support for a water sprinkling system comprising:
an upper hollow vertical portion, said upper portion having oppositely disposed vertically elongated openings at its lower end thereof; and
a lower portion, said lower portion forming a tapered spike adapted to be driven into the ground, and anti-rotation means disposed on said lower portion.

7. A support for a water sprinkling system comprising:
an upper hollow vertical portion, said upper portion having oppositely disposed elongated openings at its lower end thereof;
a lower portion, said lower portion forming a tapered spike adapted to be driven into the ground; and
vertical vanes formed on opposite sides of said upper and lower portion.

8. A support for a water sprinkling system comprising:
an upper hollow vertical portion, said upper portion having oppositely disposed vertically elongated openings at its lower end thereof;
a lower portion, said lower portion forming a tapered spike adapted to be driven into the ground; and
vertical vanes formed on the sides of said lower portion.

9. A sprinkler system, including:
a connector for connection with a fluid conduit, said connector having an opening in its upper sides;
a tubular riser member having its lower end secured in the opening of said connector;
a sprinkler head attached to the upper end of said riser member;
a support for said connector riser member and sprinkler head, said support being adapted to be disposed below ground level, said support having a hollow vertical upper portion, an annular horizontal disc at the upper end of said hollow vertical portion, said said disc having an upwardly opening recess therein with an annular shoulder at the bottom of said recess, said riser member extending upwardly in said hollow upper portion and said sprinkler head being disposed in said recess and resting on and supported by said shoulder, the top of said head being horizontal and in substantially the plane of the upper rim of said recess, said lower portion of said support forming an anchor for said support, and said lower portion being provided with anti-rotational means.

References Cited by the Examiner

UNITED STATES PATENTS

| 1,430,620 | 10/22 | Brauer | 239—276 |
| 1,612,135 | 12/26 | Lorraine | 239—204 |
| 2,066,531 | 1/37 | Holden | 239—276 |
| 2,746,792 | 5/56 | Hough | 239—276 |
| 3,021,078 | 2/62 | Nickell | 239—204 |
| 3,083,914 | 4/63 | Smith et al. | 239—201 |

FOREIGN PATENTS

| 787,687 | 12/57 | Great Britain. |
| 291,548 | 12/31 | Italy. |

EVERETT W. KIRBY, *Primary Examiner.*